US011614183B2

(12) United States Patent
Gutmann

(10) Patent No.: US 11,614,183 B2
(45) Date of Patent: Mar. 28, 2023

(54) INSULATED HOSE ARRANGEMENTS

(71) Applicant: Swagelok Company, Solon, OH (US)

(72) Inventor: Daniel Gutmann, Aurora, OH (US)

(73) Assignee: Swagelok Company, Solon, OH (US)

( * ) Notice: Subject to any disclaimer, the term of this patent is extended or adjusted under 35 U.S.C. 154(b) by 438 days.

(21) Appl. No.: 16/810,900

(22) Filed: Mar. 6, 2020

(65) Prior Publication Data

US 2020/0292106 A1    Sep. 17, 2020

Related U.S. Application Data

(60) Provisional application No. 62/818,983, filed on Mar. 15, 2019.

(51) Int. Cl.
*F16L 33/00* (2006.01)
*F16L 11/10* (2006.01)
*F16L 11/04* (2006.01)

(52) U.S. Cl.
CPC .............. *F16L 11/10* (2013.01); *F16L 11/045* (2013.01); *F16L 33/00* (2013.01)

(58) Field of Classification Search
CPC ....... F16L 13/143; F16L 59/00; F16L 59/027; F16L 59/10; F16L 59/181
USPC ........ 138/109, 149, 137, 140, 141; 285/174, 285/256, 242, 321, 55, 381.4
See application file for complete search history.

(56) References Cited

U.S. PATENT DOCUMENTS

| 3,473,575 | A |   | 10/1969 | Vogelsang |            |
|-----------|---|---|---------|-----------|------------|
| 3,492,029 | A |   | 1/1970  | French    |            |
| 3,791,415 | A |   | 2/1974  | Lawless   |            |
| 4,106,526 | A | * | 8/1978  | Szentmihaly | F16L 33/2076 285/259 |
| 4,142,554 | A | * | 3/1979  | Washkewicz | F16L 33/2076 138/109 |
| 4,275,769 | A | * | 6/1981  | Cooke     | F16L 33/2076 428/921 |
| 4,307,756 | A |   | 12/1981 | Voight    |            |
| 4,366,841 | A | * | 1/1983  | Currie    | F16L 33/2076 138/109 |

(Continued)

FOREIGN PATENT DOCUMENTS

| CN | 107614953 A | 1/2018 |
| CN | 109070521 A | 12/2018 |

(Continued)

OTHER PUBLICATIONS

International Search Report and Written Opinion from PCT/US2020/021302 dated May 4, 2020.

(Continued)

*Primary Examiner* — Patrick F Brinson
(74) *Attorney, Agent, or Firm* — Calfee, Halter & Griswold LLP

(57) ABSTRACT

A hose assembly includes a hose defining an internal fluid passage and an exterior surface, an end connection attached to a first end of the hose, an insulation material wrapped onto the exterior surface of the hose, a cover installed over the insulation material, and an elastomeric sleeve extending over and in compressive engagement with at least a portion of the end connection and the cover. The insulation material, the cover, and the elastomeric sleeve are each rated for continuous use at a temperature of at least about 135° C.

25 Claims, 2 Drawing Sheets

(56) References Cited

U.S. PATENT DOCUMENTS

| | | | |
|---|---|---|---|
| 4,567,916 A | | 2/1986 | Antal |
| 4,905,736 A | * | 3/1990 | Kitami ................. F16L 33/2076 138/109 |
| 5,349,988 A | * | 9/1994 | Walsh ................. F16L 33/2075 138/121 |
| 5,358,012 A | * | 10/1994 | Kish ................... F16L 33/2076 138/140 |
| 5,366,841 A | * | 11/1994 | Patel .................... G03G 9/0804 523/322 |
| 5,413,147 A | * | 5/1995 | Moreiras ............. F16L 25/0036 285/259 |
| 6,948,479 B1 | * | 9/2005 | Raney .................... F16L 11/26 123/456 |
| 7,104,285 B2 | * | 9/2006 | Furuta ................... F16L 11/118 138/131 |
| 7,717,138 B2 | * | 5/2010 | Takagi ................ F16L 33/2076 138/139 |
| 7,849,884 B2 | * | 12/2010 | Dickel ................ F16L 33/2073 138/109 |
| 7,868,083 B2 | | 1/2011 | Ristic-Lehmann |
| 8,127,800 B2 | | 3/2012 | Ramaswamy |
| 10,190,706 B2 | | 1/2019 | Mentik |
| 2002/0117226 A1 | | 8/2002 | Malcame |
| 2006/0196568 A1 | | 9/2006 | Leeser |
| 2006/0289561 A1 | | 12/2006 | Bourget |
| 2007/0125439 A1 | | 6/2007 | Quigley |
| 2011/0232799 A1 | | 9/2011 | Tribout |
| 2016/0312927 A1 | | 10/2016 | Blanchette et al. |

FOREIGN PATENT DOCUMENTS

| | | |
|---|---|---|
| FR | 2512167 | 3/1983 |
| FR | 3038033 | 12/2016 |

OTHER PUBLICATIONS

Aspen Aerogels, Installation Manual, Pipe and Equipment Installation, 36 pgs., 2014.

International Search Report and Written Opinion from PCT/US2021/048156 dated Dec. 22, 2021.

Office action from Chinese Application No. 202080021175.4 dated Nov. 14, 2022.

Unpublished assembly instructions for insulated hose sold before Mar. 15, 2018.

\* cited by examiner

INSULATED HOSE ARRANGEMENTS

CROSS-REFERENCE TO RELATED APPLICATION

This application claims priority to and all benefit of U.S. Provisional Patent Application Ser. No. 62/818,983, filed on Mar. 15, 2019 and entitled INSULATED HOSE ARRANGEMENTS, the entire disclosure of which is incorporated herein by reference.

TECHNICAL FIELD

The present disclosure relates to flexible hose assemblies and to methods of making flexible hose assemblies. More particularly, the disclosure relates to flexible hoses having thermal insulation configured to maintain hose flexibility while providing for extreme operating temperatures (e.g., temperatures as low as −53° C. and/or as high as 250° C.).

SUMMARY OF THE DISCLOSURE

In accordance with an embodiment of one or more of the inventions presented in this disclosure, a hose assembly includes a hose defining an internal fluid passage and an exterior surface, an end connection attached to a first end of the hose, an insulation material wrapped onto the exterior surface of the hose, a cover surrounding the insulation material, and an elastomeric sleeve extending over and in compressive engagement with at least a portion of the end connection and the cover. The insulation material, the cover, and the elastomeric sleeve are each rated for continuous use at a temperature of at least about 135° C.

In accordance with another embodiment of one or more of the inventions presented in this disclosure, a method of making a hose assembly is contemplated. In the exemplary method, a hose is provided, with the hose defining an internal fluid passage and an exterior surface, and an end connection attached to a first end of the hose. An insulation material is wrapped onto the exterior surface of the hose, and a cover is installed over the insulation material. An elastomeric sleeve is installed over and in compressive engagement with at least a portion of the end connection and the cover. The insulation material, the cover, and the elastomeric sleeve are each rated for continuous use at a temperature of at least about 135° C.

BRIEF DESCRIPTION OF THE DRAWINGS

Further advantages and benefits will become apparent to those skilled in the art after considering the following description and appended claims in conjunction with the accompanying drawings, in which:

DESCRIPTION OF THE EXEMPLARY EMBODIMENTS

Figure 1:
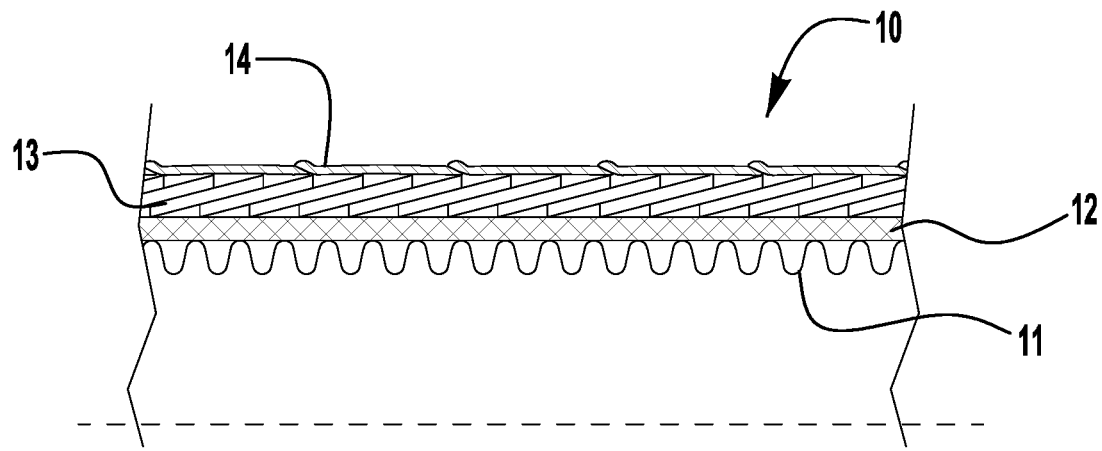
FIG. 1 is a half-longitudinal cross-sectional view of a section of insulated hose, in accordance with an exemplary embodiment of the present disclosure.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions-such as alternative materials, structures, configurations, methods, circuits, devices and components, software, hardware, control logic, alternatives as to form, fit and function, and so on-may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Many applications have requirements for flexible hose to provide a fluid connection between two points in a fluid system, with the flexibility of the hose allowing for various fluid line routing requirements, thermal expansion, misalignment, and intermittent or continuous flexing (e.g., due to system vibrations). Some flexible hoses may be provided with a core tube material (e.g., stainless steel) selected for suitability for use with extreme high or low system temperatures that have relatively high thermal conductivity. Such hoses may require insulation surrounding the core tube, for example, to provide stability of temperature control, to avoid condensation in low temperature applications, and/or to protect users from burns in high temperature applications. Known insulated hose assemblies use fiberglass-based or "black foam" insulation encased around the hose, which often result in a significant increase in the outer diameter of the insulated hose assembly, and/or reduced flexibility of the hose assembly. Many insulation materials are prone to generating excessive dust or other contaminants, which are particularly undesirable in some hose applications.

According to an exemplary aspect of the present disclosure, a hose may be provided with an insulating wrap arrangement that maintains flexibility, facilitates fabrication, provides cleaner, reduced contaminant construction, and/or further extends temperature ratings. In one embodiment, an aerogel composite insulation material (e.g., a tape, strip, or sheet) may be wrapped around an outer surface of a hose to provide exterior insulation for the hose. The aerogel composite may include a variety of suitable materials, including for example, an expanded PTFE (ePTFE) and aerogel mixture formed, for example, by extrusion or two-roll processing. The insulation material may, but need not, form a core attached to an outer membrane or film on either or both sides of the core material. Exemplary PTFE-aerogel composite insulation materials are described in U.S. Pat. No. 7,868,083, the entire disclosure of which is incorporated herein by reference.

In an exemplary embodiment, a PTFE-based aerogel insulation material may be selected to provide one or more of the following properties: a continuous use temperature between about −53° C. and about 250° C. (for example, for use with system fluids at these temperatures) and a thermal conductivity of less than about 25 mW/m K (e.g., about 21 mW/m K) at room temperature (about 23° C.), a thermal conductivity of about 26 mW/m K at about 225° C., and capable of meeting UL94 V-0 flammability ratings. An exemplary PTFE-based aerogel may include an ePTFE matrix configured to hold aerogel crystals for minimal dust or particle shedding. Additionally, the material may be hydrophobic to minimize the absorption of moisture yet vapor permeable to prevent corrosion of a metal surface of the hose (e.g., metal braiding) under the insulation.

The insulation material may be provided in a variety of thicknesses, including, for example, between approximately 0.5 mm and 5 mm thick (e.g., approximately 1.5 mm thick), and may be cut to a variety of suitable widths, including, for example, between approximately 0.5 inches and 5 inches wide (e.g. approximately 1.5 inches wide). The insulation material may be wrapped around the hose in a variety of arrangements, including for example, longitudinally or spiral-wrapped arrangements. In an exemplary embodiment, the insulation material is spiral wrapped with a predetermined overlap, for example, to prevent exposure of the underlying hose surface when the hose is bent or flexed. In some embodiments, the degree of overlap may be selected such that a single strip of the insulation material may provide multiple layers of insulation material, for example, to provide increased insulation properties, increased operating temperature range, and/or enhanced handling safety. For example, the insulation material may be provided with a 50% overlap to provide two layers of insulation material using a single strip of the insulation material, or a 66% overlap to provide three layers of insulation material using a single strip of the insulation material. Additionally or alternatively, multiple strips or wraps of the insulation material may be wrapped around the hose to provide multiple layers of insulation material. For example, two strips of insulation material may each be wrapped, one over the other, with 0% overlap to provide two layers of insulation material, or with 50% overlap to provide four layers of insulation material. The additional strip may be wound opposite the first wrap or longitudinally offset from the first strip, for example, to prevent exposure of the underlying hose surface when the hose is bent or flexed.

According to another aspect of the present disclosure, the insulated hose may be provided with a cover similarly selected for extreme temperature ratings (e.g., up to 150° C., or between −200° C. and 180° C., for example, for use in environments at these temperatures), waterproofing, vapor permeability, and flame resistance. While many different cover materials may be utilized, in an exemplary embodiment, a durable, thermally resistant engineered fabric may be used as a cover wrap for the hose. The fabric may be provided in an elongated strip having a suitable width (e.g., between about 1 inch and about 5 inches, or about 3 inches), spiral wrapped over the insulation material. Exemplary materials include aramid fiber fabrics, such as Kevlar®, or ePTFE-based engineered fabrics, such as Gore-Tex®. The engineered fabric may be sufficiently stretchable to maintain bendability/flexibility of the wrapped hose and may be wrapped on the insulation material without adhesively bonding the fabric cover to the insulation material to further maintain bendability/flexibility of the wrapped hose. In one such embodiment, the engineered fabric may include a matrix oriented to minimize stretchability along the length of the fabric strip (e.g., less than about 1% elongation at 5 lbs tensile force) while provide more substantial stretchability across the width of the strip (e.g., at least about 10% elongation at 5 lbs tensile force). This arrangement provides tension (e.g., about 5 lbs tensile force) to secure the wrapped fabric cover in place (even in the absence of an adhesive bond), while maintaining high flexibility and low bending force of the wrapped hose.

In an exemplary embodiment, an engineered fabric cover wrap is formed from fire retardant PTFE/polyester fabric having a density of approximately 5 oz per square yard and an operating temperature range of −200° C. to 180° C., provided in an approximately 3 inch wide strip and tightly spiral wrapped around an insulation wrapped hose in an overlapped fashion (e.g., approximately 50% overlap). FIG. 1 illustrates an exemplary insulated hose section 10 having a corrugated metal (e.g., stainless steel) core tube 11 defining an internal fluid passage and a braided metal sheath 12 defining an exterior surface of the hose 10. Other hose materials (e.g., PTFE), layers, and configurations may additionally or alternatively be utilized. A strip of PTFE-based aerogel insulation material 13 (e.g., having one or more of the properties described above) approximately 1.5 mm thick and approximately 1.5 inches wide is spiral wrapped onto the braided metal sheath 12 with a 50% overlap, to provide a substantially uniform double layer of insulation material along the length of the hose 10. A strip of PTFE/polyester engineered fabric 14 (e.g., having one or more of the properties described above) approximately 3 inches wide, and having a density of approximately 5 oz per square yard, is spiral wrapped onto the insulation material 13 with a 50% overlap, to a tension of at least about 5 lbs, to provide a substantially uniform double layer of cover fabric 14 along the length of the hose 10.

In another exemplary embodiment, a heat shrunk polymeric cover may be applied or installed over the insulation layer, for example, in a material selected to provide a flame retardant cover and/or to prevent vapor permeability of the insulated hose assembly. In one example, a polyolefin tube having a thickness of about 1 mm when shrunk and an operating temperature range of −55° C. to about 135° C. may be installed over the insulation layer and heat shrunk into compressive retention (e.g., tension of at least 5 lbs)

against the insulation layer. In an exemplary arrangement, an insulation wrapped hose is inserted through a polyolefin tube (with air plumbed into the tube to inflate the tube, if needed). The tube is heated (e.g., by a heat gun and/or oven) to temperatures up to about 177° C. to shrink the tube material into compressive engagement with the insulation layer. Ends of the heat shrunk tube may be trimmed as needed.

Figure 2:
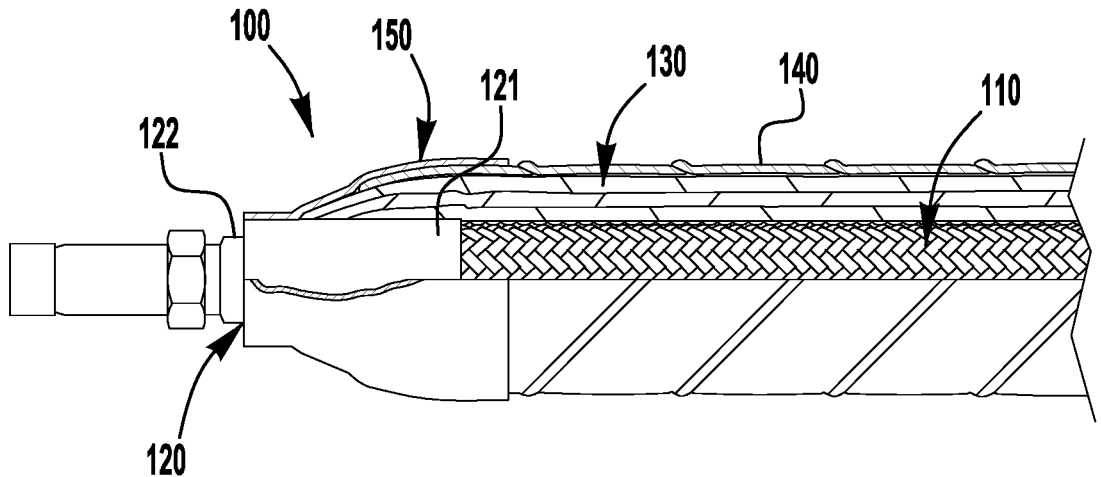
FIG. 2 is a partial cross-sectional view of an insulated hose assembly, in accordance with another exemplary embodiment of the present disclosure.
Figure 2A:
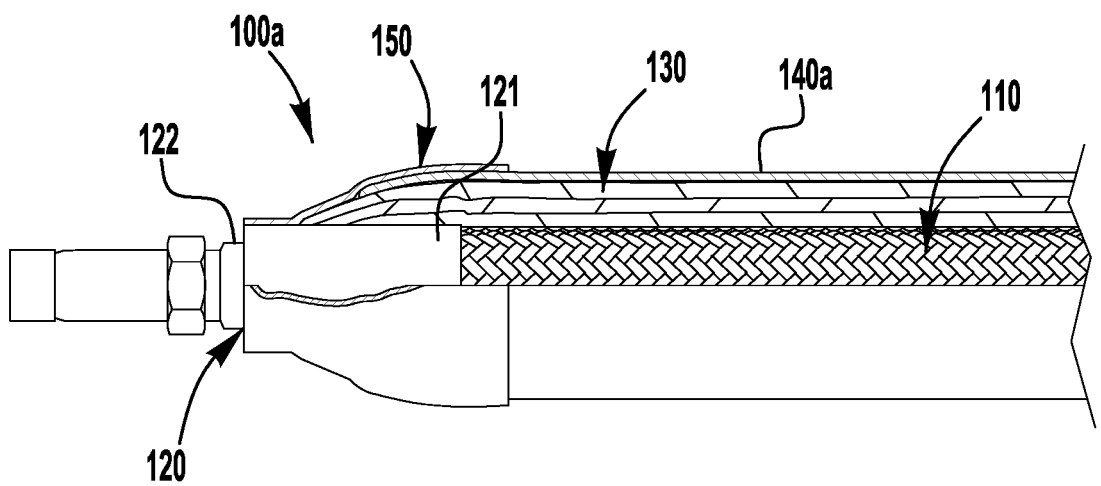
FIG. 2A is a partial cross-sectional view of another insulated hose assembly, in accordance with another exemplary embodiment of the present disclosure.

A conventional hose includes metal end connections for connecting the hose within a fluid control system. While these metal connections are usually rated to withstand extreme temperatures, user handling of the thermally conductive end connections may be hazardous when the hose is exposed to extreme temperatures. According to another aspect of the present disclosure, a thermal resistant sleeve may be provided over a metal end connection of a hose, extending over an end portion of the insulation material and cover of the hose assembly. FIGS. 2 and 2A illustrate an exemplary hose assembly 100, 100a including an inner, sheathed hose 110 (e.g., corrugated core tube and braided metal sheath, as shown in FIG. 1) extending to a metal end connection 120 (e.g., tube stub end connection for welding or connection with a tube fitting) crimped, welded, or otherwise attached to the hose 110, an insulation material 130 (e.g., the spiral wrapped strip of PTFE-based aerogel insulation material 13 of the embodiment of FIG. 1), and a cover 140, 140a. In the illustrated embodiment of FIG. 2, the cover 140 is formed from a spiral-wound strip of fabric (e.g., the spiral wound strip of PTFE/polyester engineered fabric 14 of the embodiment of FIG. 1). In the illustrated embodiment of FIG. 2A, the cover is formed from a heat-shrunk polymeric tube (for example, as described above). As shown, the insulation material 130 and cover 140, 140a may (but need not) extend over a rearmost portion or collar 121 of the metal end connection 120. A thermally resistant sleeve 150 is installed over a base portion 122 of the end connection and extends rearward over the end portions of the insulation material 130 and cover 140, 140a. The sleeve may be provided in a material having a continuous use temperature comparable to that of the insulation material (e.g., at least about 250° C., or about 260° C.), such as, for example, silicone. While only one end of the hose assembly 100, 100a is shown, an opposite end of the hose assembly may (but need not) include a similar end connection and sleeve arrangement.

While some conventional hose sleeves are provided in heat shrunk material to reliably grip the hose or hose end, the exemplary thermally resistant sleeve may be provided in a material selected to permit elastic stretching or expansion of the sleeve for alignment of the sleeve with the hose end (e.g., adjacent portions of the end connection and cover), and subsequent contraction into gripping or compressive retained engagement on the hose end. In an exemplary embodiment, a silicone sleeve has a durometer of between about 20 and about 50, or between about 35 and about 45, or about 40, to permit elastic stretched installation of the sleeve. Further, the silicone sleeve may be peroxide cured (e.g., black high temperature peroxide cured silicone tubing, capable of meeting UL94 V-0 flammability ratings) to minimize drying or cracking of the sleeve due to prolonged exposure to high temperatures.

EXAMPLE 1

Figure 3:
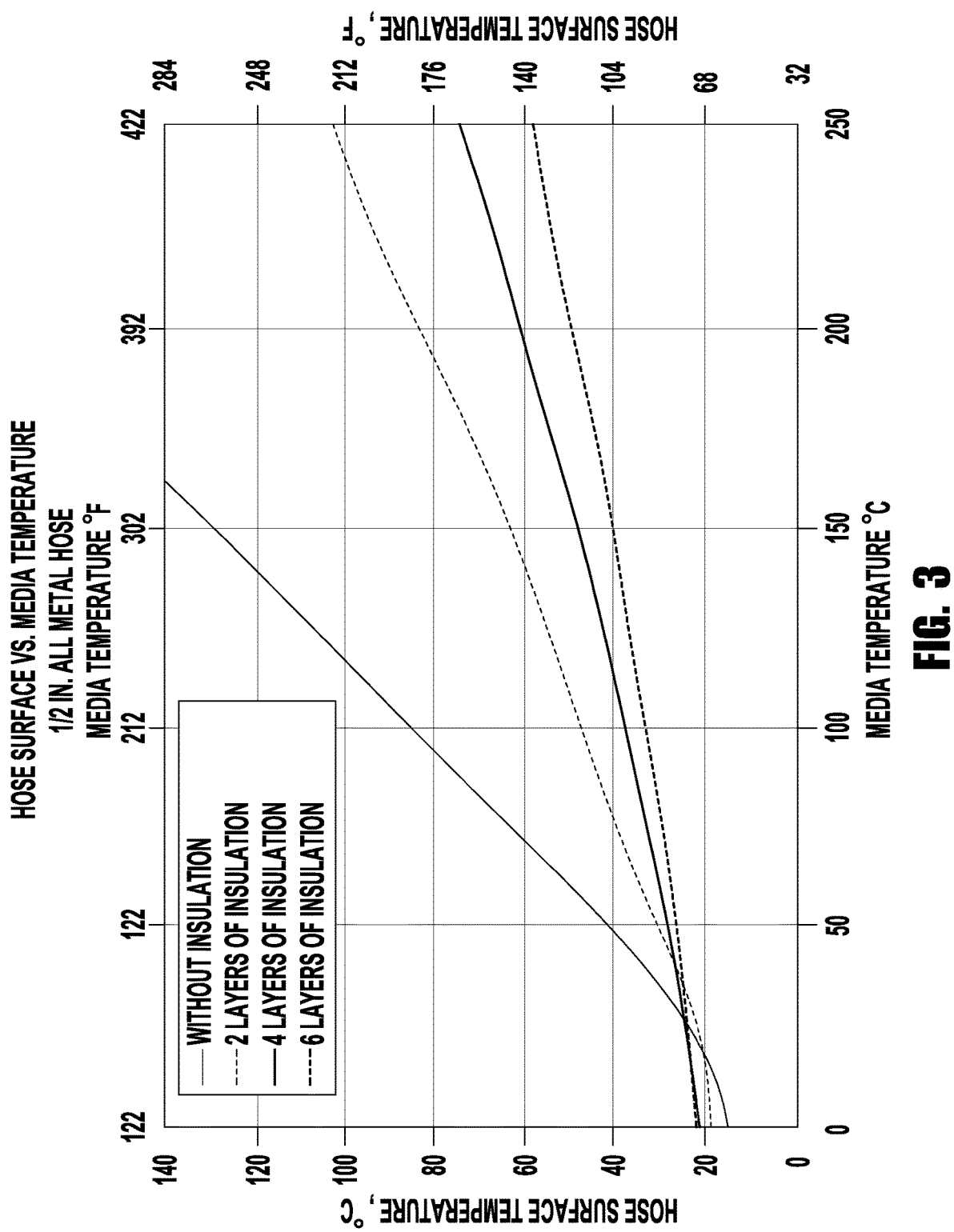
FIG. 3 illustrates a chart showing exterior surface temperatures for insulated hose used in high temperature fluid conditions.

Samples of bulk hose product having a ½ inch nominal diameter flexible metal hose, with corrugated stainless steel core tube and braided metal sheath, are wrapped with two, four, or six layers of 1.5 mm thick PTFE-aerogel composite insulation, and covered with a spiral wound strip of PTFE/polyester engineered fabric. FIG. 3 illustrates a chart showing an exterior surface temperature for the insulated hose assemblies in room temperature (about 24° C.) applications, when exposed to liquid media fluid temperatures up to 250° C., as compared to a bulk (non-insulated) hose assembly. As evident from the chart, an insulated hose in accordance with the present disclosure may provide for a "touch safe" (60° C. maximum, per ASTM C1055) exterior surface at fluid temperatures up to about 140° C. with two layers of insulation material, up to about 195° C. with four layers of insulation material, and greater than 250° C. with six layers of insulation material.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

I claim:

1. A hose assembly comprising:
   a hose defining an internal fluid passage and an exterior surface;
   an end connection attached to a first end of the hose;
   an insulation material wrapped onto the exterior surface of the hose;
   a cover surrounding the insulation material; and
   an elastomeric sleeve extending over and in compressive engagement with at least a portion of the end connection and the cover, the elastomeric sleeve being provided in a material configured to permit elastic stretched installation of the elastomeric sleeve over the end connection and the cover;
   wherein the insulation material, the cover, and the elastomeric sleeve are each rated for continuous use at a temperature of at least about 135° C.

2. The hose assembly of claim 1, wherein the insulation material comprises a PTFE-based aerogel.

3. The hose assembly of claim 1, wherein the insulation material is rated for continuous use at temperatures between about −53° C. and about 250° C.

4. The hose assembly of claim 1, wherein the insulation material is rated for continuous use at a temperature of at least about 250° C.

5. The hose assembly of claim 1, wherein the insulation material has a maximum thermal conductivity of less than about 25 mW/m K at about 23° C.

6. The hose assembly of claim 1, wherein the insulation material is capable of meeting UL94 V-0 flammability ratings.

7. The hose assembly of claim 1, wherein the insulation material comprises a first strip of insulation material spiral wrapped onto the exterior surface of the hose.

8. The hose assembly of claim 7, wherein the first strip of insulation material is spiral wrapped onto the exterior surface of the hose with an approximately 50% overlap.

9. The hose assembly of claim 7, wherein the insulation material comprises a second strip of insulation material spiral wrapped onto the first strip of insulation material.

10. The hose assembly of claim 7, wherein the first strip of insulation material has a maximum elongation along the length of about 1% at 5 lbs tensile force, and a minimum elongation across the width of about 10% at 5 lbs tensile force.

11. The hose assembly of claim 1, wherein the cover comprises a fabric cover wrapped onto the insulation material.

12. The hose assembly of claim 11, wherein the fabric cover comprises a PTFE/polyester engineered fabric.

13. The hose assembly of claim 11, wherein the fabric cover comprises a fabric strip spiral wrapped onto the insulation material.

14. The hose assembly of claim 13, wherein the fabric strip is spiral wrapped onto the insulation material with an approximately 50% overlap.

15. The hose assembly of claim 13, wherein the fabric strip is spiral wrapped onto the insulation material without adhesive.

16. The hose assembly of claim 13, wherein the fabric strip is spiral wrapped to maintain a tension of at least about 5 lbs.

17. The hose assembly of claim 1, wherein the cover comprises a heat shrunk polymeric tube.

18. The hose assembly of claim 17, wherein the polymeric tube comprises polyolefin.

19. The hose assembly of claim 1, wherein the elastomeric sleeve comprises silicone.

20. The hose assembly of claim 19, wherein the elastomeric sleeve comprises a peroxide cured silicone.

21. The hose assembly of claim 1, wherein the elastomeric sleeve is rated for continuous use at a temperature of at least about 250° C.

22. The hose assembly of claim 1, wherein the hose comprises a corrugated metal tube defining the internal fluid passage.

23. The hose assembly of claim 1, wherein the hose comprises a braided metal sheath defining the exterior surface.

24. The hose assembly of claim 1, further comprising a second end connection attached to a second end of the hose, and a second elastomeric sleeve extending over and in compressive engagement with at least a portion of the second end connection and the cover.

25. A method of making an insulated hose assembly, the method comprising:
   providing a hose defining an internal fluid passage and an exterior surface, and an end connection attached to a first end of the hose;
   wrapping an insulation material onto the exterior surface of the hose;
   installing a cover around the insulation material; and
   elastically stretching an elastomeric sleeve over and into compressive engagement with at least a portion of the end connection and the cover;
   wherein the insulation material, the cover, and the elastomeric sleeve are each rated for continuous use at a temperature of at least about 135° C.

* * * * *